J. FARLOW.
Improvement in Potato-Diggers.
No. 129,120. Patented July 16, 1872.
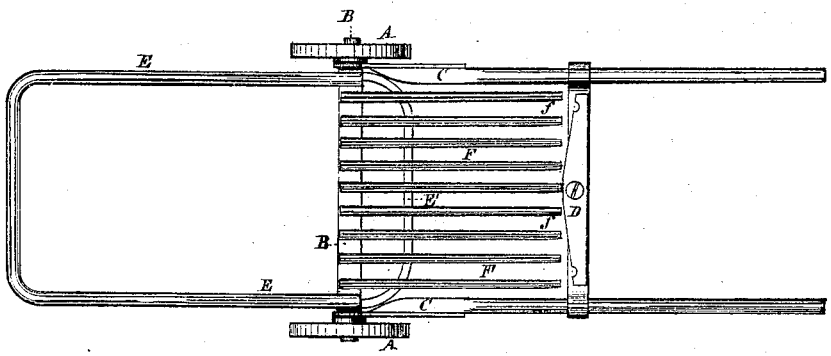

UNITED STATES PATENT OFFICE.

JULIAN FARLOW, OF HARRISON, INDIANA, ASSIGNOR TO HIMSELF AND PETER STEIN.

IMPROVEMENT IN POTATO-DIGGERS.

Specification forming part of Letters Patent No. 129,120, dated July 16, 1872.

Specification describing an Improvement in Potato-Diggers, invented by JULIAN FARLOW, of Harrison, in the county of Vigo and State of Indiana.

The invention will first be fully described and then clearly pointed out in the claim.

The drawing is a plan view of the machine.

A A represent the wheels; B, the axle; C, the shafts, loosely attached to said axle; and D, the single-tree. To the axle I rigidly connect a lever-frame, E. This construction will allow the axle to be vibrated at the option of a driver walking behind it. E' is a projection of lever-frame, which extends beyond the axle, and may be formed in the same piece with said frame or attached separately to the axle. On the axle, or a flat bar fastened thereto, are fastened the teeth F, beveled under the point at $f$, and supported by the projection E', to which they are also fastened.

The mode of operation is as follows: The horse being placed in line with the row of potatoes and started, just before arriving at a hill of potatoes the lever-frame is elevated. This causes the teeth to pass under the hill of potatoes. Immediately after passing the hill the levers are depressed so as to raise the potatoes, sift the dirt from them, and cause them to roll back upon the ground or into a bag or other receptacle placed in the lever-frame and immediately behind the axle. This operation of raising and depressing the frame is repeated at every hill until the end of row is attained.

Practical experiment has demonstrated that this simple and inexpensive machine, with one man to operate it, will effectually and thoroughly dig a greater number of bushels of potatoes in a day than can be accomplished by three men with any device now known to the public.

I am aware that forks connected in divers ways with wheels and axles are old and well known to the public, and therefore I desire to disclaim the idea broadly, and confine myself to my particular mode of connecting these parts for the purpose of forming a potato-digger.

I am aware that a patent has been granted for a potato-digger where the handle of fork is supported in the axle, and another where it is supported in a pendant therefrom; therefore I do not claim these features of construction.

What I do claim is—

A potato-digger on wheels provided with teeth attached at their heels rigidly to the axle as a back, and supported on an extension, E', of the lever-frame intermediately between their points and heels, as and for the purpose described.

JULIAN + FARLOW.
his mark.

Attest:
GEO. C. DUY,
SOLON C. KEMON.